US 8,245,277 B2

(12) United States Patent
Lazar et al.

(10) Patent No.: US 8,245,277 B2
(45) Date of Patent: Aug. 14, 2012

(54) UNIVERSALLY USABLE HUMAN-INTERACTION PROOF

(75) Inventors: Jonathan K. Lazar, Columbia, MD (US); Harry Hochheiser, Baltimore, MD (US); Jinjuan Feng, Ellicott City, MD (US); Graig Sauer, Baltimore, MD (US); Jonathan D. Holman, Ashburn, VA (US)

(73) Assignee: Towson University, Towson, MD (US)

( * ) Notice: Subject to any disclaimer, the term of this patent is extended or adjusted under 35 U.S.C. 154(b) by 325 days.

(21) Appl. No.: 12/579,680

(22) Filed: Oct. 15, 2009

(65) Prior Publication Data

US 2010/0095350 A1      Apr. 15, 2010

Related U.S. Application Data

(60) Provisional application No. 61/196,135, filed on Oct. 15, 2008.

(51) Int. Cl.
*H04L 9/32*      (2006.01)
(52) U.S. Cl. ................................. 726/2; 726/3
(58) Field of Classification Search ............. 726/2–4, 726/27–30; 713/165–167, 193–194
See application file for complete search history.

(56) References Cited

U.S. PATENT DOCUMENTS

| 7,565,330 B2 | 7/2009 | Steeves et al. |
| 7,603,343 B2 | 10/2009 | von Ahn Arellano et al. |
| 7,890,857 B1 * | 2/2011 | Jouppi .......................... 715/243 |
| 7,975,150 B1 * | 7/2011 | Lillibridge et al. ........... 713/193 |
| 2005/0014118 A1 | 1/2005 | von Ahn Arellano et al. |
| 2006/0179053 A1 | 8/2006 | von Ahn Arellano et al. |
| 2009/0113294 A1 | 4/2009 | Sanghavi et al. |
| 2009/0138723 A1 | 5/2009 | Nyang et al. |
| 2010/0031330 A1 | 2/2010 | Von Ahn et al. |

FOREIGN PATENT DOCUMENTS

| WO | 2005005004 A1 | 1/2005 |
| WO | 2008091675 A1 | 7/2008 |

OTHER PUBLICATIONS

T. Schluessler, S. Goglin, & E. Johnson, "Is a Bot at the Controls? Detecting Input Data Attacks," Proceedings of the 6th ACM SIGCOMM Workshop on Network and System Support for Games, Netgames '07, Sep. 19-20, 2007, Melbourne, Australia.

K. Chellapilla, K. Larson, P. Simard & M. Czerwinski, "Designing Human Friendly Human Interaction Proofs (HIPs)," Proceedings of the SIGCHI Conference on Human Factors in Computing Systems, CHI 2005, Apr. 2-7, 2005, Portland, Oregon, US.

(Continued)

*Primary Examiner* — Hosuk Song
(74) *Attorney, Agent, or Firm* — Whiteford, Taylor & Preston L.L.P.

(57) ABSTRACT

Disclosed is a system and method for generating a universally usable, completely automated public turing test to tell a computer and a human apart (CAPTCHA). The universally usable CAPTCHA uses contextually related pictures and sounds to present concepts to a user. The pictures allow the CAPTCHA to be used by someone who could see, and the audio would allow the CAPTCHA to be used by someone who could not see. This combination of sound and images should make the CAPTCHA more universally usable for a larger population of users than previously known CAPTCHAs.

16 Claims, 4 Drawing Sheets

OTHER PUBLICATIONS

L. Von Ahn, M. Blum, & J. Langford, "Telling Humans and Computers Apart Automatically," Comm. of the ACM, Feb. 2004 / vol. 47, No. 2, pp. 57-60.

J. Holman, J. Lazar, J. Feng, & J. D'Arcy, "Developing Usable CAPTCHAs for Blind Users," Proceedings of the 9th International ACM SIGACCESS Conference on Computers and Accessibility, ASSETS '07, Oct. 15-17, 2007, Tempe, Arizona, US.

J. Elson, J. Douceur, & J. Howell, "Asirra: A CAPTCHA that Exploits Interest-Aligned Manual Image Categorization," Proceedings of the 14th ACM Conference on Computer and Communications Security, CCS '07, Oct. 29-Nov. 2, 2007, Alexandria, VA, US.

R. Datta, J. Li, & J. Wang, "Imagination: A Robust Image-Based CAPTCHA Generation System," Proceedings of the 13th Annual ACM International Conference on Multimedia, MM '05, Nov. 6-11, 2005, Singapore.

G Mori & J. Malik, "Recognizing Objects in Adversarial Clutter: Breaking a Visual CAPTCHA," Computer Vision and Pattern Recognition, 2003.

A. Schlaikjer, "A Dual-Use Speech CAPTCHA: Aiding Visually Impaired Web Users while Providing Transcriptions of Audio Streams," CMU-LTI-07-014, Language Technologies Institute, School of Computer Science, Carnegie Mellon University, Nov. 2007, Pittsburgh, PA, US.

ReCAPTCHA: Stop Spam, Read Books, http://recaptcha.net, accessed May 7, 2008.

J. D'Arcy & J. Feng, "Investigating Security-Related Behaviors Among Computer Users with Motor Impairments," Poster Abstracts of SOUPS 06, available via http://cups.cs.cmu.edu/soups/2006/posters/darcy-poster_abstract.pdf, accessed Mar. 10, 2007.

J. Johnston, J. Eloff, & L. Labuschagne, "Security and Human Computer Interfaces," Computers & Security 22(8), pp. 675-684, 2003.

S. Robinson, "Human or Computer? Take This Test," The New York Times, Dec. 10, 2002, available via http://query.nytimes.com/gst/fullpage.html?res=9907E5DF163AF933A25751C1A9649C8B63.

M. Sasse, S. Brostoff, & D. Weirich, "Transforming the 'Weakest Link'—a Human/Computer Interaction Approach to Usable and Effective Security," BT Technology Journal, 19(3): pp. 122-130, Jul. 2001.

L. Von Ahn, M. Blum, N. Hopper, & J. Langford, "CAPTCHA: Using Hard AI Problems for Security," available via http://www.cs.cmu.edu/~biglou/captcha_crypt.pdf, accessed Apr. 3, 2007.

World Wide Web Consortium (W3C), "Inaccessibility of CAPTCHA: Alternatives to Visual Turing Tests on the Web," W3C Working Group Note, available via http://www.w3.org/TR/turingtest/, Nov. 23, 2005.

J. Yan & A. El Ahmad, "A Low-Cost Attack on a Microsoft CAPTCHA," School of Computing Science, Newcastle University, UK, available via http://homepages.cs.ncl.ac.uk/jeff.yan/msn_draft.pdf, accessed Jun. 2, 2008.

CAPTCHA.NET, "CAPTCHA: Telling Humans and Computers Apart Automatically," retrieved on Jun. 7, 2007 from www.captcha.net.

* cited by examiner

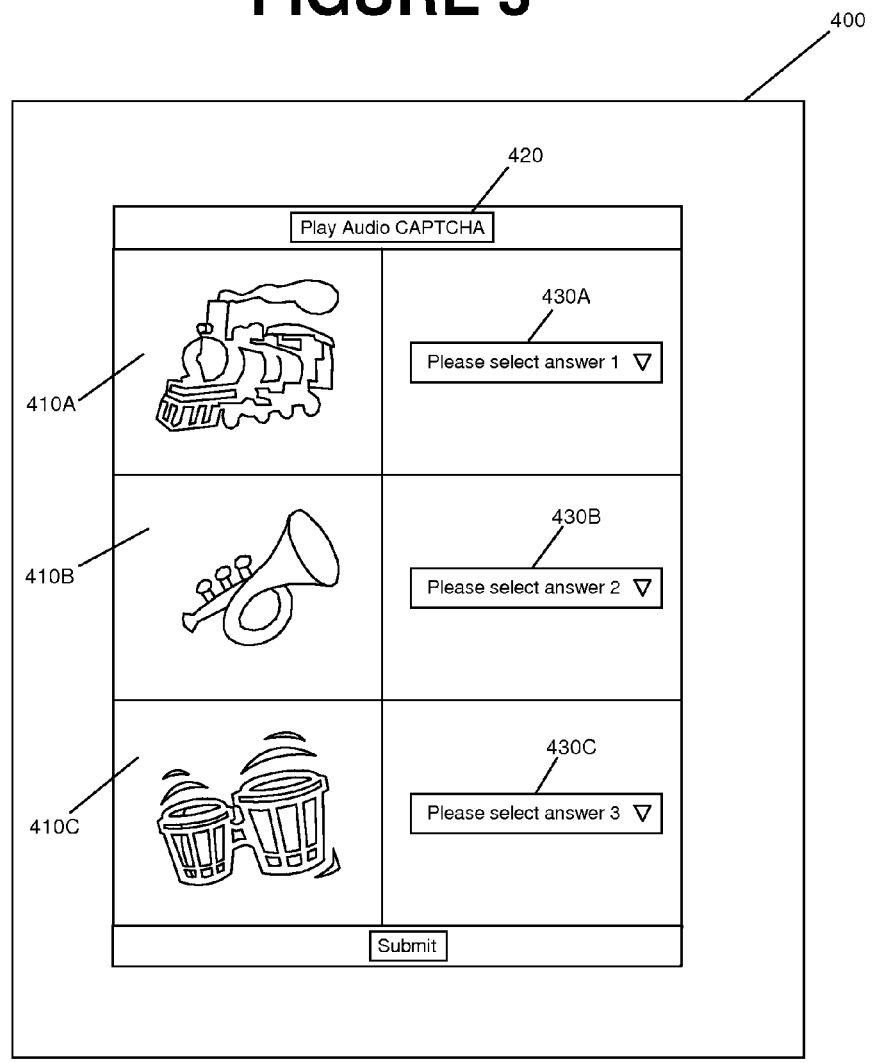

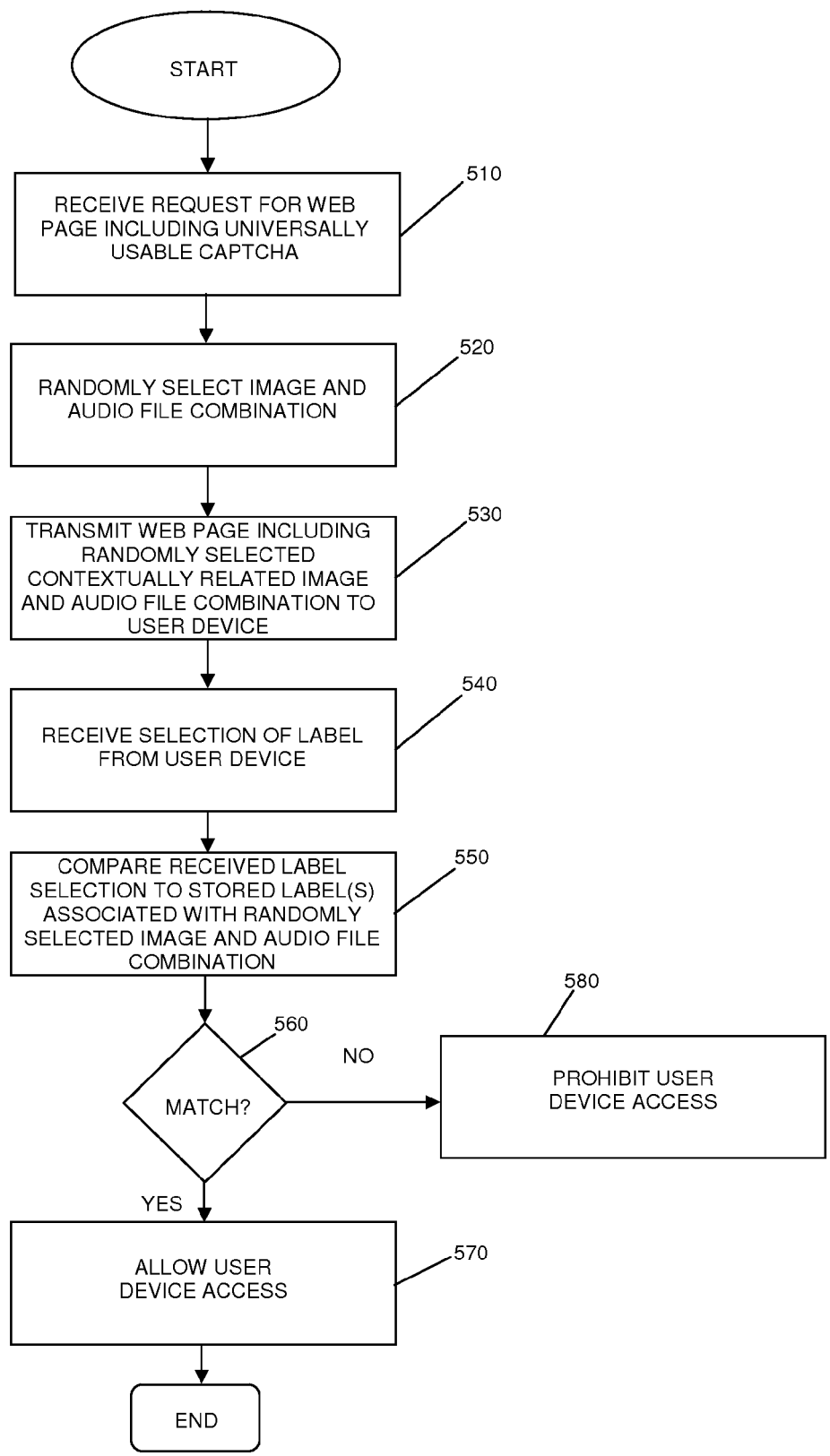

UNIVERSALLY USABLE HUMAN-INTERACTION PROOF

CROSS REFERENCE TO RELATED APPLICATIONS

This application is based upon and claims benefit of copending U.S. Provisional Patent Application Ser. No. 61/196,135 entitled "Universally Usable Human-Interaction Proof", filed with the U.S. Patent and Trademark Office on Oct. 15, 2008 by the inventors herein, the specification of which is incorporated herein by reference.

FIELD OF THE INVENTION

This invention relates generally to completely automated public turing tests to tell computers and humans apart (CAPTCHAs), and more particularly to CAPTCHAs configured for use by persons with perceptual limitations.

BACKGROUND

Despite growing interest in designing usable systems for managing privacy and security, recent efforts have generally failed to address the needs of users with disabilities. As security and privacy tools often rely upon subtle visual cues or other potentially inaccessible indicators, users with perceptual limitations may find such tools particularly challenging. Human-Interaction Proof (HIP) tools, commonly known as CAPTCHAs, may be used for instance to authenticate users to allow access to web pages, registration with various online services, inputting of an online vote, and the like. The CAPTCHA typically presents a user with a test, which test is designed so that it may somewhat easily be completed by a human, but is quite difficult to be completed by a computer, such that for any successfully completed CAPTCHA test, an assumption may be made that it was a human user that entered the solution.

Typical CAPTCHAs have required a user to type some number of characters that are presented in a distorted image. Distortion of the image can make automated recognition via optical character recognition software difficult, thus making the text interpretable by humans but not by automated tools. Unfortunately, however, for the approximately 161 million people worldwide having some type of visual impairment, the task of identifying what characters are presented in the distorted image can be difficult, if not impossible, to accomplish.

Other CAPTCHAs have comprised images or pictures presented to a user, typically in the form of a real world object or a commonly recognized shape. For instance, a user may be shown a picture of a cow, and tasked with identifying the subject of the picture as a cow. Likewise, the user may be shown a picture of three circles and a square, and tasked with clicking on the square.

Still other CAPTCHAs have comprised audio recordings in which a user listens to an audio file, such as spoken words or numbers or sounds related to a particular image, often with audio distortion overlaying the primary audio file, and is tasked with identifying the particular sound.

Efforts have also been made to combine visual distorted text and audio in a CAPTCHA, such as in the ReCAPTCHA product developed by Carnegie Mellon University. For the audio portion, the user is presented with an audio clip in which eight numbers are spoken by various individuals. In more recent versions, such ReCAPTCHA product has used short audio clips from old radio shows. In either case, background noise is applied to make it harder for hacker bots and the like to break the CAPTCHA. The user is then asked to fill in a form with those eight numbers and hit a submit button, at which point they are presented with either a "correct" or "incorrect" reply. Unfortunately, testing has suggested that even such combined CAPTCHAs fail to sufficiently improve the security screening process for persons having perceptual disabilities.

It would therefore be advantageous to provide a CAPTCHA that is capable of distinguishing between humans and computers, while being easier to use for a broader range of users than previously known CAPTCHAs, and particularly being capable of use by a broad range of users of differing backgrounds and abilities.

SUMMARY OF THE INVENTION

Disclosed herein is a universally usable CAPTCHA that joins visual and audio presentations to produce a single system in which the audio is directly contextually related to the visual elements that are presented to the user. As used herein, the term contextually related means that a contextual relationship exists between the subject matter of the visual elements of an image presented to a user and the sound that is embodied in the audio file presented to the user. Such a combined visual and audio CAPTCHA is more accessible for users with visual impairments than previously known CAPTCHAs, and may provide an added benefit of easier adaptation for different languages and cultures.

The universally usable CAPTCHA uses contextually related pictures and sounds to present concepts to a user. The pictures allow the CAPTCHA to be used by someone who could see, and the audio would allow the CAPTCHA to be used by someone who could not see. This combination of sound and images should make the CAPTCHA more universally usable for a larger population of users than previously known CAPTCHAs. Moreover, using a CAPTCHA to relay a concept instead of a particular textual string, and requiring a user to identify and understand that concept in order to solve the CAPTCHA, is expected to make such CAPTCHA more secure than previously known CAPTCHAs. As generalizable image processing and sound recognition tools are not readily available, images and sounds used in the universally usable CAPTCHA should be relatively resistant to automated attacks. Another benefit of such universally usable CAPTCHA is that it is anticipated that it would be relatively easy to internationalize. Because the universally usable CAPTCHA would use pictures and sound effects, many of these concepts (although not culturally-specific ones) could be used all over the world. The only thing that would need to be changed for developing the system for another language is changing the labels for the sound/image combinations. As described in Sauer, G., Lazar, J., Hochheiser, H., and Feng, J. (2009), Towards A Universally Usable Human Interaction Proof: Evaluation of alternative designs (currently under review at ACM Transactions on Accessible Computing), which is incorporated herein by reference in its entirety, such a universally usable CAPTCHA provides significant benefits to visually impaired users by improving accessibility to various electronic services accessible through the Internet.

DESCRIPTION OF THE DRAWINGS

The above and other features, aspects, and advantages of the present invention are considered in more detail, in relation to the following description of embodiments thereof shown in the accompanying drawings, in which:

FIG. 3 is a schematic view of an alternative universally usable CAPTCHA generated by the system of FIG. 1; and FIG. 4 is a flowchart illustrating a method of providing a universally usable CAPTCHA in accordance with a preferred embodiment of the invention.

DETAILED DESCRIPTION OF THE PREFERRED EMBODIMENT

Figure 1:
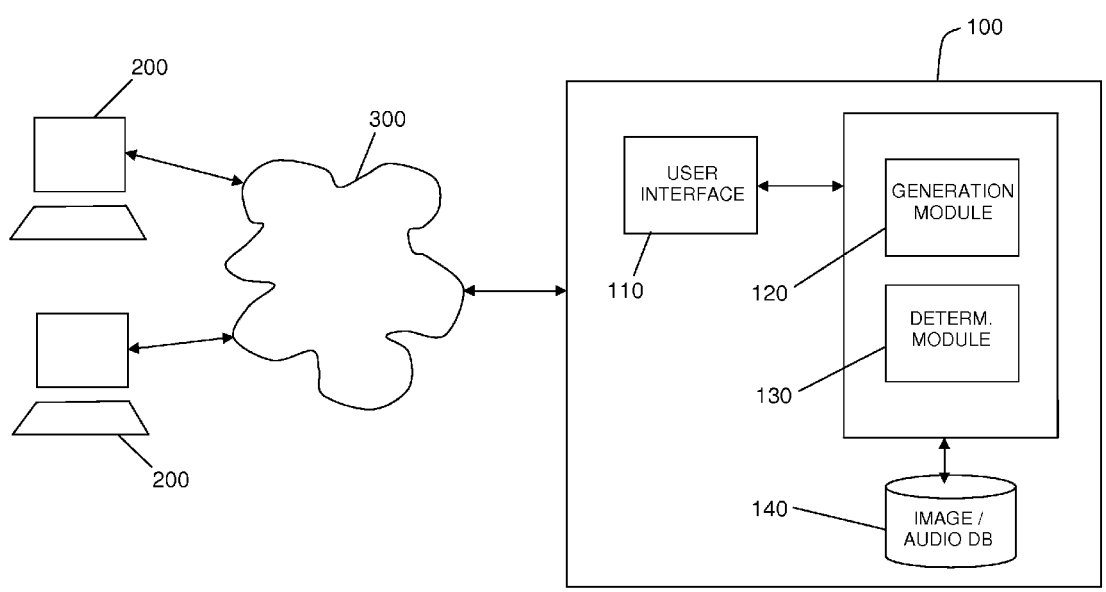
FIG. 1 is a schematic view of an exemplary network configuration in which a universally usable CAPTCHA generating system is applied in accordance with a preferred embodiment of the invention.

The invention summarized above may be better understood by referring to the following description, which should be read in conjunction with the accompanying drawings in which like reference numerals are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

FIG. 1 provides an exemplary computer network configuration suitable for implementing the universally usable CAPTCHA described herein. It is noted, however, that such system is exemplary only, and that the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays, application specific integrated circuits, or the like, may also be used without departing from the spirit and scope of the instant invention.

Referring again to FIG. 1, a universally usable CAPTCHA generating system 100 is connected to one or more user client devices 200 through a computer network 300, such as a wide area network such as the Internet. Universally usable CAPTCHA generating system 100 is configured to generate a universally usable CAPTCHA comprising contextually related visual and audio content, provide such universally usable CAPTCHA to a user client device 200, and determine if access by the user client device 200 is permitted depending upon the response from the user client 200 that received the universally usable CAPTCHA.

In the exemplary embodiment of FIG. 1, universally usable CAPTCHA generating system 100 preferably includes a user interface module 110, a universally usable CAPTCHA generating module 120, a CAPTCHA solution determination module 130, and an image/audio database 140.

User interface 110 preferably provides a connection to user client device 200, receiving a web page request from user client device 200 and providing a web page with a universally usable CAPTCHA back to the user client device 200. The user interface 110 also receives a response back from user client device 200 in the form of a selection of a label that is provided as one of several solution options for the universally usable CAPTCHA, as described in greater detail below.

Figure 2:
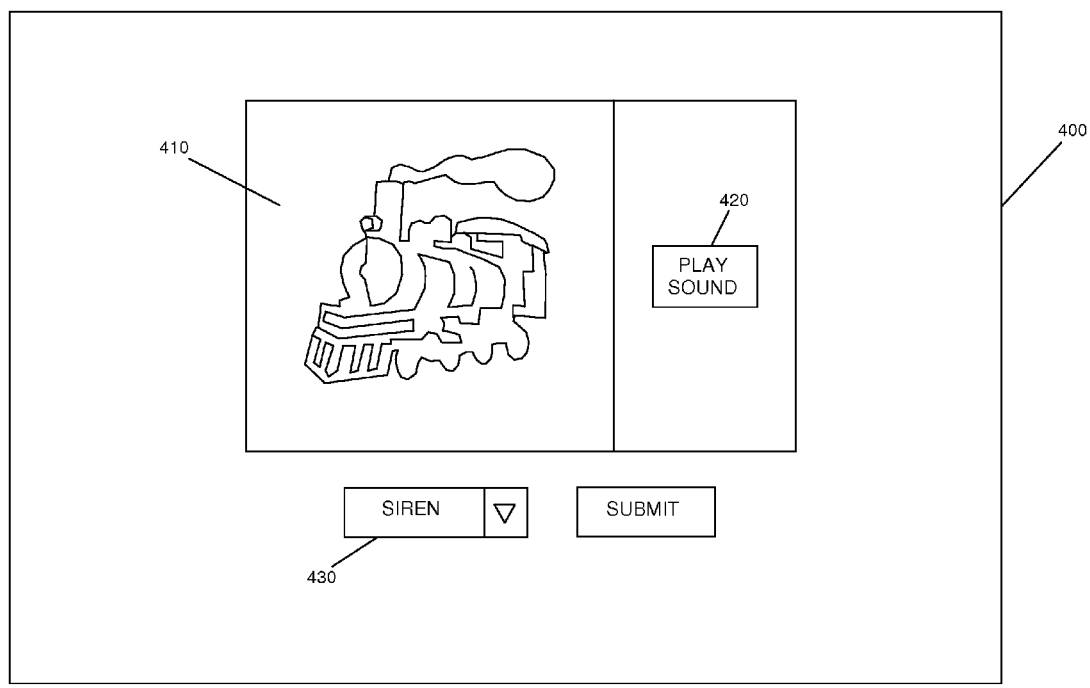
FIG. 2 is a schematic view of a universally usable CAPTCHA generated by the system of FIG. 1.

When CAPTCHA generating system 100 receives a request through user interface 110 from a user client device 200 for a web page that includes a universally usable CAPTCHA, universally usable CAPTCHA generation module 120 randomly selects an image and audio file combination from image/audio database 140, and transmits to user client device 200 a web page displaying the randomly selected picture. An exemplary representation of such a web page 400 is shown in FIG. 2, and in accordance with a first particularly preferred embodiment includes an image 410. A button 420 is provided that, in response to a selection of button 420 from client user device 200, loads and plays the audio file contextually associated with image 410. By way of non-limiting example, image 410 may comprise a picture of a train, and the contextually associated audio file loaded by actuation of "PLAY SOUND" button 420 may be an audio recording of a train chugging along railroad tracks, a train whistle or bell, and the like.

In a particularly preferred embodiment, the image and audio file combinations stored in database 140 are preferably categorized into the categories of transportation, animals, weather, and musical instruments. It was found that these four categories were easy to recognize for a majority of potential users, without any special training or experience. For instance, such contextually related image and audio file combinations could include images and audio recordings relating to a bird, a cat, a drum, or a piano. Any items that have multiple easily identifiable labels are preferably not used.

Moreover, it is noted that the universally usable CAPTCHA generating system described herein quite intentionally uses commonly recognized sounds instead of alpha-numerically spoken characters or words, as such commonly recognized sounds are, given today's technology, more difficult to automatically identify using speech recognition or similar technologies.

After a user views image 410 and/or listens to the audio file activated by button 420, they may select a label 430 that describes the common context of image 410 and the contextually related audio recording. In the exemplary embodiment of FIG. 2, a pull down list of labels 430 is provided that includes the correct label that accurately describes the context of image 410 and the related audio recording, along with a number of labels that do not describe such context. While the number of labels provided may vary, it should be a sufficient number so as to minimize the likelihood that a random selection would provide the correct selection. Optionally, more than one correct selection may be provided (such as "bird" or "blue jay") for a single image/audio file combination, so long as a sufficiently larger number of incorrect labels are also included to minimize the probability of a correct, random selection.

After the user selects a label from the pull down list of labels 430, determination module 130 receives the user's label selection through user interface 110, and determines whether the selected label is the label that accurately describes the context of image 410 and the related audio recording, and thus whether access by user device 200 is authorized. Those of ordinary skill in the art will recognize that in addition to basing such authorization decision on whether the selected label matches the label that accurately describes the context of image 410 and the related audio recording, determination module 130 may also receive additional data, such as session start time, number of attempted selections, and the like, and may additionally base such authorization decision on the time delay between the first presentation of the universally usable CAPTCHA to user device 200 and the receipt of a label selection through user interface 110, the number of previous incorrect attempts to select a label, and other factors without departing from the spirit and scope of the invention.

Determination module 130 determines whether or not the user selected the correct label, and thus whether or not user device 200 may access another, subsequent page that the universally usable CAPTCHA is intended to guard access to, before such access is granted. Those of ordinary skill in the art will recognize that such determination may be made by way of a simple lookup function in which determination module 130 consults image/audio database 140, determines the particular label or labels associated with the image and sound files randomly selected and transmitted to user device 200, and directly compares the stored, associated label or labels with the selected label to determine if a match exists. If the user selected label does not match the label that accurately describes the context of image 410 and the related audio recording, then access by user device 200 to such subsequent page is not allowed. If, however, such user selected label does match the label that accurately describes the context of image 410 and the related audio recording, then access by user device 200 is allowed to such subsequent page.

With regard to another embodiment of the invention, and with particular reference to FIG. 3, a single user of a user device 200 may be confronted with more than one image and audio file combination, and determination module 130 may require that the such user get all solutions correct in order to correctly complete the universally usable CAPTCHA and obtain the desired access. By adding such complexity associated with the additional image and audio file combinations, additional security and resiliency against attacks will result. As shown in FIG. 3, web page 400 may provide multiple image and audio file combinations, with multiple images 410A, 410B, and 410C being shown to the viewer. While a separate "Play Sound" button may optionally be provided for each image, it was deemed preferable to provide only a single audio file comprised of a concatenation of the three audio files associated with the randomly selected images 410A, 410B, and 410C, such single audio file being capable of being played upon a user's engagement of "Play Audio CAPTCHA" button 420 on web page 400. Each audio file is still maintained in image/audio file database 140 as a separate file, but at the time that generation module 120 randomly selects multiple image and audio file combinations, the selected audio file portions are concatenated into a single audio file to be played back to a user. Having such a single audio file provides both a security and usability benefit, as separate audio files create security flaws where a limited corpus of image and audio file combinations is available, and having a single "button" to play the associated sounds significantly decreases the amount of time a blind user would need to spend navigating through web page 400. Moreover, randomly trimming arbitrary amounts of signal from both ends of the individual audio recordings prior to concatenation may hinder attacks based on segmentation of the audio file. Still further variation in sound clips, and thus added security, may be achieved by extracting short clips from longer pieces, such as by arbitrarily dividing a 90 second recording of piano music into approximately 3 second intervals.

Those of ordinary skill in the art will recognize that more or fewer image and audio file combinations may be provided than the specific examples set forth here without departing from the spirit and scope of the invention, although it is noted that adding more image and audio file combinations generally increases security at the cost of efficiency. Also, while the simple addition of such image and audio file combinations to the corpus of data that an automated bot would have to search expands the search space that such a bot would have to deal with, it would be advisable to update and refresh such objects over time in order to prevent man-powered attacks.

Optionally, the particular images stored in image/audio file database 140 may be categorized under particular contexts, such that any randomly selected image and audio file combination that is to be used on a web page 400 may not only randomly select a particular context for the image and audio file combination, but likewise may randomly select particular image and/or audio files associated with such context. Internet based image search engines may be used to retrieve a large set of images associated with any given context or search term. The combination of periodic prefetching of images and extraction of arbitrary subsets of each image may be used to discourage attackers who attempt to perform similar queries on image search engines in order to identify the stimuli used.

The selection of appropriate matching sound clips and images is an important factor for user performance. The match between the term, the image, and the sound effect should be clear, unique, and obvious. Sometimes multiple concepts or terms may be connected to the same image/sound pair. For instance, both thunder and lightning may be valid solutions for the sound of thunder and the image of lightning. Similarly, both alarm and siren may be valid answers on the sound of a siren. However, some sounds may prove to be problematic (e.g., it was found in one test that a pig sound effect was not clear and obvious enough to easily identify for a user who is unable to view the associated image of a pig, and in another test that a wolf howl sound effect caused at least one test user to look for the word "fox" as a solution to the CAPTCHA). Sound effects that were well received by the participants included glass breaking, truck, train, siren, and bell sound effects.

It was also found that the sound effects need to have a minimum duration in order to be clear to the users. A large part of this is caused by the screen reader software that blind computer users will often use as a computing aid. With screen reader software, every key that is pressed is spoken through the computer speakers. Thus, if users use the enter or spacebar key to press the "Play Sound" button 420, the computer will be saying "Enter" or "Space" while the sound is playing. If the sound is not long enough to keep playing after the screen reader feedback, the user will not be able to hear it clearly. Thus, it may be desirable in certain circumstances to repeat the sound effect a few times. For instance, in prior testing a cat sound clip was very brief and had a cat meow only once. A few users missed the sound the first time they heard it. In contrast, a dog sound had a dog barking three times, which was easier for the users to capture. If the user was unsure what the particular sound was the first time, the repetition helped them understand the sound. Another possibility for compensating for the screen reader software reading the key presses is inserting a delay before the sound plays. The cost is that this will slow down the time it takes for users to complete the universally usable CAPTCHA and that a delay on a web site can give the impression of a poor server, slow connection, or a web site that is currently down.

Also, one major security concern with such a universally usable CAPTCHA is the problem of sound identification via checksum or file signature. This may be addressed by inserting, by way of non-limiting example, random "non-audible" noise (outside the range of human hearing) to the sound files as they are being processed. By inserting this noise randomly, the checksums and file signatures of the files would change every single time they are played. Moreover, the introduction of non-audible white noise to the background of the audio files may be used to keep the sound wave frequencies at a constant level throughout the entire file, thus increasing the difficulty of automated analysis. Such addition of high frequency white noise to the current clean audio files ads a layer of obfuscation, and thus security, making it more difficult for a bot or other automated device to evaluate, while ensuring that humans can still identify the sound. In a particularly preferred embodiment, a file of white noise at a frequency of 18 k is used, which frequency was found to be high enough to be outside of the range of normal human hearing. Such white noise may be mixed with the current, clean, non-altered audio files to create an audio file that resembles a large chunk of 18 k frequency noise to a sound wave analyzer, while a human remains capable of discerning and identifying the underlying, original audio recording.

Additionally, broad spectrum white noise may be added that may minimally be heard by the end user but would be more difficult to filter out.

Those of ordinary skill in the art will recognize that other elements may be included in universally usable CAPTCHA generating system 100, such as elements configured to manage the generation and termination of a particular session with one or more user client devices 200, which processing elements are well known to those of ordinary skill in the art, and thus will not be discussed further herein. Those of ordinary skill in the art will also recognize that while the above description provides for the selection of a particular label among a number of labels presented to a user device 200, it is also envisaged that an operator of user device may instead input their own textual description of the image and/or audio file, and that determination module 130 may read such textual description, compare the words of such textual description with approved terms associated with the image and audio file presented to user device 200 (which approved terms are likewise stored in image/audio database 140), and allow access by user device 200 upon a determination that a sufficient number of words in the textual description match the approved terms associated with the image and audio file presented to user device 200. With regard to a particularly preferred embodiment, determination module 130 may utilize standard strategies from information retrieval technology to address usability concerns relating to suffixes, misspellings, and synonyms. The suffix problem arises from the variants of words that may be provided as correct answers. An image of a drum set, accompanied by the sounds of drums playing, may elicit responses including "drum", "drums", and "drumming." Stemming algorithms known to those of ordinary skill in the art may be used to strip such suffixes off of words, allowing all three responses to be interpreted as matching "drum."

Misspelling, particularly due to keystroke errors, is another concern. Systems that do not allow for any spelling errors may be overly restrictive, causing difficulties in both task performance time and correctness rates. A Levenshtein distance of two, for example, may be used to allow responses with up to two misspellings to be counted as correct.

Synonymy is the problem of multiple ambiguous answers. In the above-described configuration in which each image and audio file combination has an initial "correct" answer that was sought, some pairings could be potentially ambiguous. For instance, for a storm cloud image/thunder sound combination, is the desired answer "storm", "thunder", or "lightning"? A separate usability study involving seven sighted users identified the three most commonly chosen labels for each sound/image pair. Participants having no prior knowledge of the sound files or their labels were asked to listen to each sound file and give the top three labels that came to mind. This was repeated for each sound in the corpus. A resulting vocabulary consisting of up to three synonyms for each image and audio file combination was used as the set of answers that would be considered correct. Although this tactic of using synonyms gathered through research study was used in this scenario, it is very realistic to expect the database of acceptable or correct answers to change over time. Through logging of user responses, a more defined set of what users are submitting as answer may be used to more thoroughly define the database of answers. For example, if looking through the logs it is found that more users are answering "swallows" instead of "birds," the answer swallows can be added to the database of acceptable answers. Also in a completely opposite but related way, if the answer "seagull" is in the database, but through the logs it is shown that no users are using that answer, then "seagull" could be removed. This process could ultimately be automated. Because the database answers will be frequently changing to account for these log findings, it is believed that the blending of answers will not be a problem. The use of synonyms could potentially also increase the security offered by the universally usable CAPTCHA described herein. Although adding additional sounds may cause these later sounds to be difficult to categorize, and thus make them less useful and harder to solve, they may also make them more secure.

Web searches may also be used to generate synonym lists. To find a synonym for a given term, this technique starts with a search for pages containing the term. Candidate pages are then analyzed for any correlations between the target term and other words in the document. The resulting correlations may then be used to generate a subset of synonyms. This approach has several advantages over thesaurus/dictionary-based synonym generation. The use of web structure, as opposed to a static thesaurus, removes a potential target for attack. Furthermore, repeated application of this strategy, using different parameters for selection of candidate articles, might be used to generate a more unpredictable set of synonyms. For example, random selection of candidate articles from the most highly-ranked search result might lead to differing correlations, and therefore differing synonym sets, with each execution. This approach may provide increased resiliency against some forms of attack, at the possible cost of decreased usability due to confusion regarding synonyms that were once, but are no longer, accepted as valid.

The above-described universally usable CAPTCHA may also be configured to assist dyslexic users by using a "prediction feature," combining the concept of a drop down feature with a free text input box, by allowing the user to type their answer, and as they are typing the answer the determination module 130 may suggest correct spellings for the term that such user is trying to input.

FIG. 4 is a flowchart illustrating a method of providing a universally usable CAPTCHA according to one embodiment of the invention. At step 510, universally usable CAPTCHA system 100 receives a request from a user device 200 for a web page including a universally usable CAPTCHA. Such request will be generated, for example, when a user of user device 200 attempts to access an online service that requires completion of a CAPTCHA in order to allow such access. After receiving such request, at step 520 universally usable CAPTCHA system 100 (and more particularly universally usable CAPTCHA generating module 120) randomly selects an image and audio file combination from image/audio file database 140 (which image and audio file, as described above, are contextually related to one another), and at step 530 transmits a web page including the randomly selected, contextually related image and audio file combination to user device 200. At step 540, universally usable CAPTCHA generating system 100 receives a selection of a label 430 from user device 200, and at step 550 determination module 130 compares the received label selection to the stored label or labels that are associated with the randomly selected image and audio file combination. At step 560, universally usable CAPTCHA generating system then determines whether a match exists between the user selected label and the stored label or labels associated with the randomly selected image and audio file combination, and if such a match exists, allows user device 200 access at step 570. If, on the other hand, it is determined that a match does not exist, then access by user device 200 is prohibited at step 580. Those of ordinary skill in the art will recognize that such access refers generally to access to any additional web pages and/or computerized systems and services that the universally usable CAPTCHA is intended to guard access to.

The foregoing universally usable CAPTCHA generating system (and the associated methods described above) may be used to help protect web sites against unauthorized access, while at the same time allowing effective use by individuals with visual impairment. To best implement such system and methods, it is advisable to provide as large a collection of contextually associated image and sound files as is practical and as a particular situation will allow. If the search space is too small, universally usable CAPTCHA will be subject to brute force attacks. Also, it would be desirable to randomize the audio file names every time generation module 120 is engaged to select and transmit an image and audio file combination to a user device 200, or to have all file names randomly chosen to be renamed to temp before being transmitted to a user device 200. Either of these file renaming options will make it difficult for a bot to catalog the filenames for purposes of knowing how to correctly respond in future access attempts. Such feature also has the complication of serving many users simultaneously, so it is important to make sure that each user's session files do not interfere with other concurrent sessions.

Obscuring the file size along with the file name would also deter brute force attacks. This can be done by making all of the file sizes the same size, thus defeating any attempts at cataloging file sizes. Finally, if there are more than two or three incorrect responses received from user device 200, such user device 200 should be locked out from further access attempts.

Still other benefits may result from such universally usable CAPTCHA as described herein. More particularly, the relative lack of culturally-specific content may make such universally usable CAPTCHA relatively easy to translate for users who are not English speakers or otherwise comfortable with Roman alphabets. An easy translation of the database 140 into another language would allow it to be used in other areas of the world other than the United States. While it is possible that some images in database 140 may be cultural specific, it should be fairly easy to eliminate those objects and replace them with objects that would more closely fit a particular culture Likewise, use of audio files as described herein may be useful for sighted users in mobile contexts, where small screens might make distorted text CAPTCHAs impractical.

The components, process steps, and/or data structures used in the system and methods described above may be implemented using various types of operating systems, computing platforms, computer programs, and/or general purpose machines. Those of ordinary skill in the art will also recognize that devices of a less general purpose nature, such as hardwired devices, field programmable gate arrays, application specific integrated circuits, or the like, may be used without departing from the spirit and scope of the invention. Likewise, those of ordinary skill in the art will recognize that the above described methods may be implemented in the form of a program that can be performed by various types of computers, and the program for performing such methods can be stored in any recording medium readable by a computer, such as a hard disk drive, CD-ROM, DVD, ROM, RAM, or flash memory. Still further, while FIG. 1 depicts a particular network configuration suitable for implementing universally usable CAPTCHA generating system 100, those of ordinary skill in the art will recognize that embodiments of the invention may be implemented on any computing platform and in any network topology, which may include personal computers, media computing platforms (e.g., cable and satellite set top boxes), handheld computing devices, cell phones, or any other type of portable communication platform Likewise, universally usable CAPTCHA generating system 100 may be implemented on a server or any variety of computing platforms, and in addition to the components shown in FIG. 1, may include (by way of non-limiting example) a memory, a processor, and a communications component, and such other computing elements as will be recognized by those of ordinary skill in the art as suitable to a particular application of the universally usable CAPTCHA generating system 100. Further, embodiments of the invention may be practiced in a wide variety of network environments, including TCP/IP based networks, telecommunications networks, wireless networks, and the like.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A computer implemented method in a security access computing system for providing secure access to an electronic service, comprising:
   providing a completely automated public turing test to tell computer and humans apart (CAPTCHA) generating computer;
   receiving at said CAPTCHA generating computer a request for a web page including a CAPTCHA;
   causing said CAPTCHA generating computer to randomly select an image file and an audio file from a collection of multiple image file and audio file pairs, wherein each of said image file and audio file pairs are contextually related to one another;
   in response to said request, transmitting from said CAPTCHA generating computer a web page including said randomly selected image file and audio file, wherein said randomly selected image file and audio file are contextually related to one another;
   receiving at said CAPTCHA generating computer a user selection of a label;
   determining at said CAPTCHA generating computer whether said user selected label matches one or more stored labels that are contextually related to said randomly selected image file and audio file; and
   allowing access to said electronic service upon a determination by said CAPTCHA generating computer that said user selected label matches said one or more stored labels.

2. The method of claim 1, wherein said image file and said audio file are maintained in a database accessible by said computing system, and wherein said database further comprises a collection of multiple image file and audio file pairs, wherein each of said image file and audio file pairs are contextually related to one another.

3. The method of claim 2, wherein said database further comprises at least one label contextually associated with each said image file and audio file pair.

4. The method of claim 1, further comprising the step of denying access to said electronic service upon a determination by said CAPTCHA generating computer that said user selected label does not match said one or more stored labels.

5. The method of claim 1, wherein said web page further comprises a user engageable function to initiate playback of said audio file.

6. The method of claim 5, wherein said user engageable function is displayed by said CAPTCHA generating computer to a user simultaneously with an image contained in said image file.

7. The method of claim 1, further comprising the step of causing said CAPTCHA generating computer to prompt a user to input a label believed to be contextually associated with said image file and said audio file.

8. The method of claim 7, wherein said prompting step further comprises presenting a plurality of labels to a user, wherein said plurality of labels includes at least one label that is contextually associated with said image file and said audio file, and at least one label that is not contextually associated with said image file and said audio file.

9. A non-transitory computer readable medium whose contents cause a security access computing system to:
- receive a request for a web page including a completely automated public turing test to tell computer and humans apart (CAPTCHA);
- randomly select an image file and an audio file from a collection of multiple image file and audio file pairs, wherein each of said image file and audio file pairs are contextually related to one another;
- in response to said request, transmit a web page including said randomly selected image file and audio file, wherein said randomly selected image file and audio file are contextually related to one another;
- receive a user selection of a label;
- determine whether said user selected label matches one or more stored labels that are contextually related to said randomly selected image file and audio file; and
- allow access to said electronic service upon a determination that said user selected label matches said one or more stored labels.

10. The non-transitory computer readable medium of claim 9, wherein said image file and said audio file are maintained in a database accessible by said computing system, and wherein said database further comprising a collection of multiple image file and audio file pairs, wherein each of said image file and audio file pairs are contextually related to one another.

11. The non-transitory computer readable medium of claim 10, wherein said database further comprises at least one label contextually associated with each said image file and audio file pair.

12. The non-transitory computer readable medium of claim 9, wherein said contents further cause said security access computing system to:
- deny access to said electronic service upon a determination that said user selected label does not match said one or more stored labels.

13. The non-transitory computer readable medium of claim 9, wherein said web page further comprises a user engageable function to initiate playback of said audio file.

14. The non-transitory computer readable medium of claim 13, wherein said user engageable function is displayed to a user simultaneously with an image contained in said image file.

15. The non-transitory computer readable medium of claim 9, wherein said contents further cause said security access computing system to:
- prompt a user to input a label believed to be contextually associated with said image file and said audio file.

16. The non-transitory computer readable medium of claim 9, wherein said contents further cause said security access computing system to:
- present a plurality of labels to a user, wherein said plurality of labels includes at least one label that is contextually associated with said image file and said audio file, and at least one label that is not contextually associated with said image file and said audio file.

* * * * *